US006938069B1

(12) United States Patent
Narayanaswamy

(10) Patent No.: US 6,938,069 B1
(45) Date of Patent: Aug. 30, 2005

(54) ELECTRONIC MEETING CENTER

(75) Inventor: Krishnamurthy Narayanaswamy, Los Angeles, CA (US)

(73) Assignee: Computing Services Support Solutions, Los Angeles, CA (US)

( * ) Notice: Subject to any disclaimer, the term of this patent is extended or adjusted under 35 U.S.C. 154(b) by 0 days.

(21) Appl. No.: 09/531,092

(22) Filed: Mar. 18, 2000

(51) Int. Cl.[7] .............................................. G06F 15/16
(52) U.S. Cl. ...................... 709/204; 709/200; 709/205; 709/206; 345/473; 345/633; 345/2.2; 348/14.1; 348/211.12; 725/119
(58) Field of Search ...................... 348/14.09; 709/204

(56) References Cited

U.S. PATENT DOCUMENTS

| | | | | |
|---|---|---|---|---|
| 5,491,743 | A * | 2/1996 | Shiio et al. | 709/204 |
| 5,541,639 | A * | 7/1996 | Takatsuki et al. | 348/14.1 |
| 5,745,161 | A * | 4/1998 | Ito | 348/14.09 |
| 5,767,897 | A * | 6/1998 | Howell | 348/14.07 |
| 5,872,923 | A * | 2/1999 | Schwartz et al. | 709/205 |
| 5,978,835 | A * | 11/1999 | Ludwig et al. | 709/204 |
| 5,995,096 | A * | 11/1999 | Kitahara et al. | 345/753 |
| 5,999,208 | A * | 12/1999 | McNerney et al. | 348/14.08 |
| 6,057,856 | A * | 5/2000 | Miyashita et al. | 345/633 |
| 6,101,532 | A * | 8/2000 | Horibe et al. | 709/206 |
| 6,154,764 | A * | 11/2000 | Nitta et al. | 709/200 |
| 6,363,352 | B1 * | 3/2002 | Dailey et al. | 369/13.02 |
| 6,453,337 | B2 * | 9/2002 | Miller et al. | 709/204 |
| 6,484,196 | B1 * | 11/2002 | Maurille | 709/206 |
| 6,629,129 | B1 * | 9/2003 | Bookspan et al. | 709/204 |

* cited by examiner

*Primary Examiner*—Ayaz Sheikh
*Assistant Examiner*—Syed A. Zia
(74) *Attorney, Agent, or Firm*—David A. Belasco; Belasco Jacobs & Townsley, LLP

(57) ABSTRACT

An electronic meeting center including at least one persistent, server-based meeting is described. The meeting has a unique identifying name and topic, at least one authorized participant and a coordinator authorized to add and remove participants. At least one persistent, server-based virtual meeting space is associated with the meeting that may be accessed by participants and the coordinator from remote locations. The center directs and controls messages having information relevant to the meeting. A dialogue buffer is associated with the meeting space and is capable of storing messages for review by the participants. The meeting space includes an agenda that includes associated goals and action items and is available to participants for viewing. Participants are informed of other participants accessing the meeting space. The center includes a library and a theatre that contains documents, addresses, references, bookmarks and multimedia displays relevant to the meeting. An administration facility provides the meeting coordinator with the ability to configure the rooms of the meeting center and associated references and documents to suit the needs of the meeting topic and the participants. The administration facility also permits the coordinator to create new meetings, agendas, goals, action items, and to control participants. Either the confirmation of the completion of an action item or the updating of an action item by the coordinator will forward at least one message to the administration facility, the participants, the meeting space, the library, the theatre or other facilities. The center automatically generates messages for meeting participants regarding relevant updates.

27 Claims, 6 Drawing Sheets

ELECTRONIC MEETING CENTER

FIELD OF INVENTION

The invention pertains to electronic conferencing systems. More particularly, the invention relates to a virtual, persistent meeting space providing a forum for an authorized set of participants, a meeting coordinator and a series of tools documents and reference materials in support of a virtual, persistent meeting.

BACKGROUND OF THE INVENTION

Various types of systems have been developed to provide electronic conferencing capabilities to individuals positioned at diverse locations. U.S. Pat. No. 5,491,743 issued to Shiio et al. is directed to a virtual conference system and terminal apparatus therefore. The conference system consists of a ring-like network capable of transmitting and receiving a digital signal and a series of user terminals connected to the network. In use, when the operator of the user terminal selects a processing menu item to perform a conference, a virtual conference room window showing the overall view of a conference room pops up on the display screen of the display of the user terminal. A conference room list window showing a list of conferences currently going on and a conference attendee window, in which animated characters representing attendance allowed to attend those conferences are arranged, are also displayed on a digital screen.

U.S. Pat. No. 5,347,306, issued to Nitta, refers to an animated electronic meeting place in which users or participants, are portrayed on a screen, with having poses generally corresponding to the poses sensed at each of the respective user stations. The animated electronic meeting place is 3-D in character and each of the users is illustrated as a caricature, doll, or other representation of himself and controlled by a personal control device. Camera, persona selection means, position detection sensor, gaze control, and microphone, are all inputs to the personal control device. U.S. Pat. No. 5,880,731, issued to Liles et al. is directed to the use of avatars with automatic gesturing and bounded interaction in on-line chat sessions.

U.S. Pat. No. 5,963,217 issued to Grayson et al. invention focuses on animating an online conference with the emphasis on conserving bandwidth by translating text to voice locally. U.S. Pat. No. 5,926,179 issued to Matsuda et al. provides a virtual space including avatars of users accessing the space and a mechanism for users to determine if online chat is possible with other users of the space. Assuming a positive result, the user may then initiate a chat session with one or more users.

While other variations exist, the above-described designs for electronic conferencing systems are typical of those encountered in the prior art. It is an objective of the present invention to provide for a virtual, persistent meeting having a unique identifying name and a unique identifying topic. It is a further objective to provide for a virtual persistent meeting space to be used for the meeting by a set of participants authorized by a coordinator. It is a still further objective of the invention to provide for the generation and transmission of various classes of messages related to the meeting. It is yet a further objective to provide a means for recordings the messages and making them available to authorized meeting participants on a persistent basis. It is still a further objective of the invention to provide a series of tools, documents, references, resources and communication capabilities uniquely linked to the meeting and its authorized participants.

While some of the objectives of the present invention are disclosed in the prior art, none of the inventions found include all of the requirements identified.

SUMMARY OF THE INVENTION

The present invention addresses all of the deficiencies of prior art electronic conferencing inventions and satisfies all of the objectives described above.

An electronic meeting center of the present invention can be constructed from the following components. At least one persistent, server-based meeting is provided. The meeting has a unique identifying name and a unique identifying topic. At least one identified participant is provided. The participant is authorized to attend the meeting. At least one identified coordinator is provided. The coordinator is authorized to add and remove participants. At least one persistent, server-based virtual meeting space is provided. The meeting space is associated with the meeting. Means for the participants and the coordinator to access the meeting space from remote locations are provided. At least one message is provided. The message includes information relevant to the meeting. The message is identified with the meeting through the name and the topic. A dialogue buffer is provided. The buffer is associated with the meeting space and the meeting and is capable of storing a message for review by the participants.

In a variant of the invention, the meeting further comprises a description and at least one keyword. In another variant, the meeting space includes an agenda. The agenda includes at least one goal associated with the meeting; at least one action item associated with the goal and is available to participants for viewing. Means are provided for representing the access of the meeting by the participant. This means informs the participants of meeting of access by other participants.

In a further variant of the invention, the meeting space includes a library room. The library room includes at least one virtual bookshelf. The bookshelf contains at least one document relevant to the meeting. The document is made accessible in the library room by the coordinator.

In still a further variant, the library room includes at least one bookmark. The bookmark references a document, an Internet Website or a local network information item relevant to the meeting. The bookmark is made accessible to all participants by the coordinator.

In yet another variant of the invention, the meeting space includes a theatre room. The theatre room includes at least one multimedia document relevant to the meeting. The multimedia document is made accessible in the theatre room by the coordinator. In still another variant, the multimedia document is a slide show, streaming video or sound recording.

In a further variant, the meeting center includes a series of tools for use of meeting participants. The tools include topical email, a notebook, an appointment book and a calculator.

In yet a further variant of the invention, the meeting space further comprises an administration room. The administration room includes means for creating new meetings, means for modifying the meeting, means for adding and deleting participants from the meeting, means for modifying features of the meeting space, means for creating and modifying documents for the library room, means for creating and modifying bookmarks for the library room, means for creating and modifying multimedia documents for the theatre room, means for updating and modifying tools and means for modifying the agenda.

In still a further variant, either the confirmation of the completion of an action item or the updating of an action item by the coordinator will forward at least one message to the administration room, the participant, the meeting space, the library, the theatre or the tools.

In another variant of the invention, the electronic meeting center includes a user-friendly, question and answer interface for creating and modifying meetings, adding and deleting participants from the meeting, modifying features of the meeting space, creating and modifying documents and bookmarks for the library room and creating and modifying multimedia documents for the theatre room.

In yet another variant, the electronic meeting center includes a means for participants to transfer between rooms of the meeting space. In still a further variant of the invention, the electronic meeting center includes a means for controlling access to the meeting. This means include means for verifying a name and a password for a participant, a means for displaying other participants currently accessing the meeting, a means for displaying other participants who have accessed the meeting since the participant last accessed the meeting, a means for displaying available documents, updates to documents and bookmarks available since the participant last accessed the meeting, a means for displaying available multimedia documents available since the participant last accessed the meeting and a means for displaying all messages relevant to the participant and the meeting.

In still a further variant, the message is chat message. The chat message is appended to the dialogue buffer and maintained there for the duration of the meeting and is available to all participants. In another variant of the invention, the message is an instant message. The instant message is delivered only to the participant for whom the message is intended and is removed from the meeting center after the intended participant is no longer accessing the meeting space.

In yet a further variant of the invention, the message is a tool message. The tool message is automatically directed to the appropriate tool for interaction with the tool. In still a further variant, the message is a document status message, the document status messages being directed to the library room as document availability and updating are affected.

In another variant, the message is a multimedia document status message. The multimedia document status message is directed to the theatre room as multimedia document availability and updating are affected.

In still another variant, the message is an agenda update message. The agenda update message is directed to the meeting space for viewing by interested participants.

In a final variant of the invention, the message is a general event message. The general event message is automatically generated when a participant accesses or leaves the meeting center. This message is used to inform other participants of meeting attendees and for directing of other messages to participants when they have accessed the system.

An appreciation of the other aims and objectives of the present invention and an understanding of it may be achieved by referring to the accompanying drawings and the detailed description of a preferred embodiment.

DETAILED DESCRIPTION OF THE PREFERRED EMBODIMENT

Figure 1:
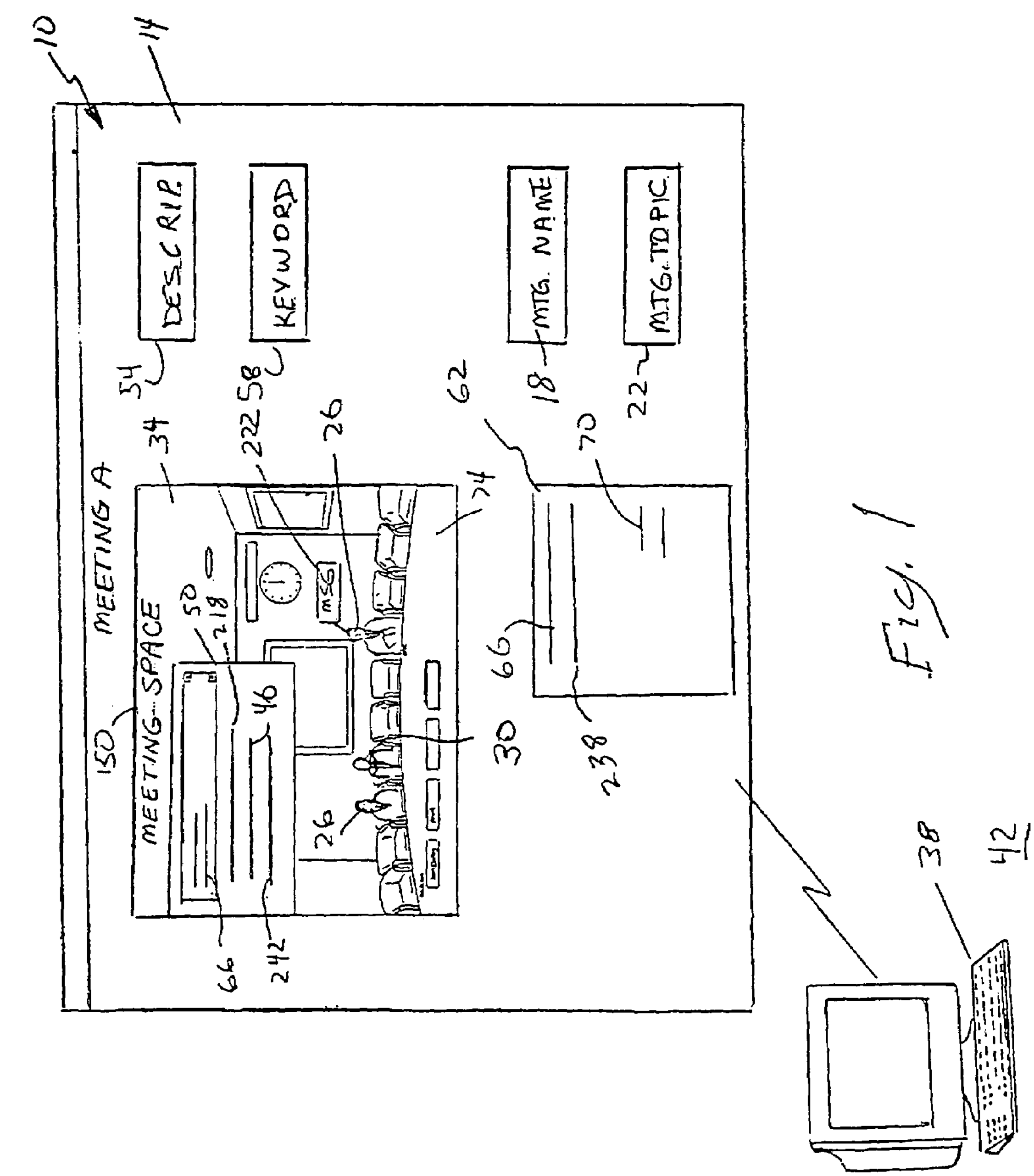
FIG. 1 is a schematic view of the preferred embodiment of the invention illustrating a meeting, a meeting space, a dialogue buffer and an agenda.
Figure 5:
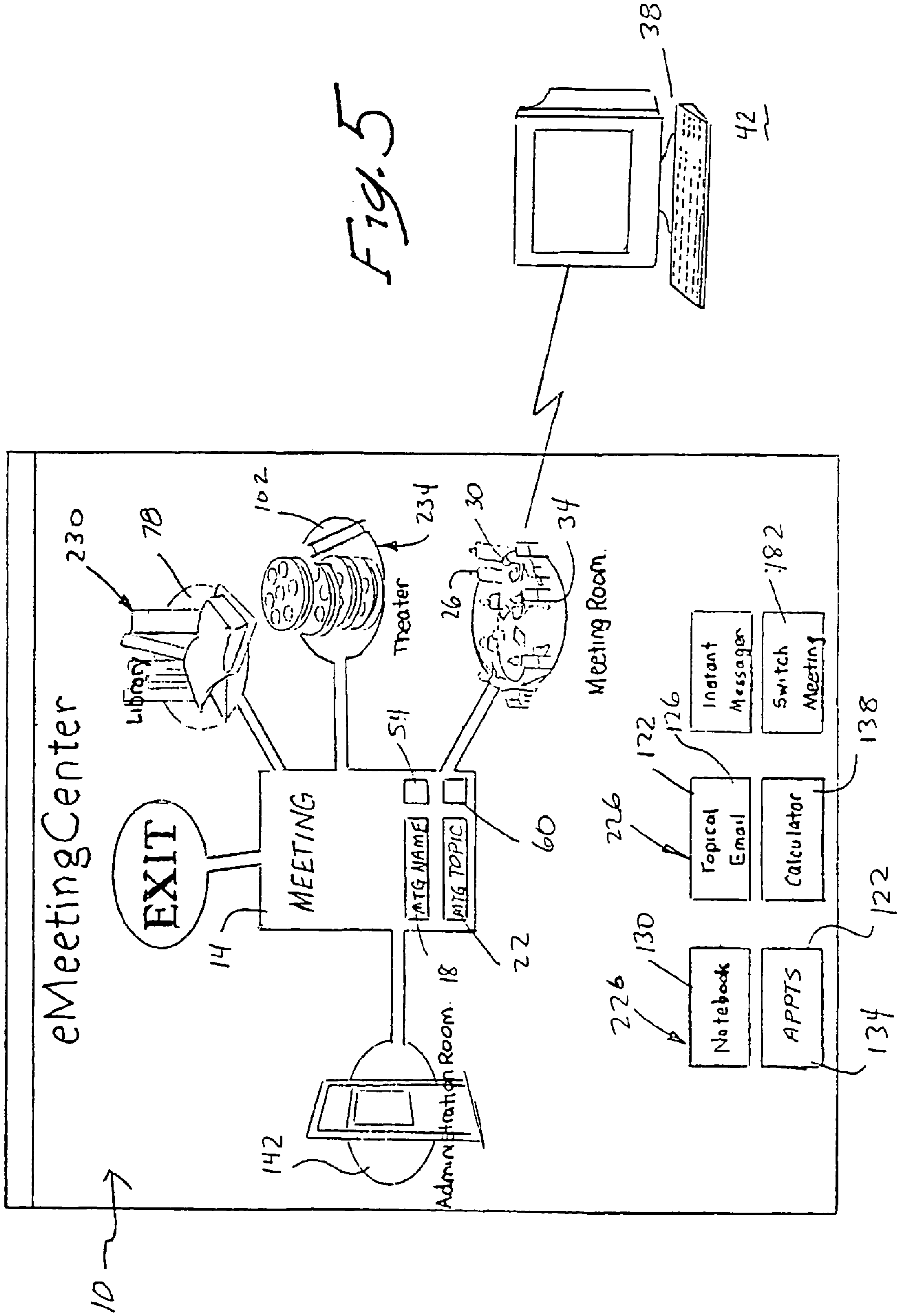
FIG. 5 is a schematic overview of the features and tools of the FIG. 1 embodiment.

FIGS. 1 and 5 illustrate an electronic meeting center 10 of the present invention constructed from the following components. At least one persistent, server-based meeting 14 is provided. The meeting 14 has a unique identifying name 18 and a unique identifying topic 22. At least one identified participant 26 is provided. The participant 26 is authorized to attend the meeting 14. At least one identified coordinator 30 is provided. The coordinator 30 is authorized to add and remove participants 26. At least one persistent, server-based virtual meeting space 34 is provided. The meeting space 34 is associated with the meeting 14. Means 38 for the participants 26 and the coordinator 30 to access the meeting space 34 from remote locations 42 are provided. At least one message 46 is provided. The message 46 includes information relevant to the meeting 14. The message 46 is identified with the meeting 14 through the name 18 and the topic 22. A dialogue buffer 50 is provided. The buffer 50 is associated with the meeting space 34 and the meeting 14 and is capable of storing a message 46 for review by the participants 26.

In a variant of the invention, the meeting 14 further comprises a description 54 and at least one keyword 58. In another variant, the meeting space 34 includes an agenda 62. The agenda 62 includes at least one goal 66 associated with the meeting 14 and at least one action item 70 associated with the goal 66 and is available to participants 26 for viewing. Means 74 are provided for representing the access of the meeting 14 by the participant 26. This means 74 informs the participants 26 of meeting 14 of access by other participants 26.

Figure 2:
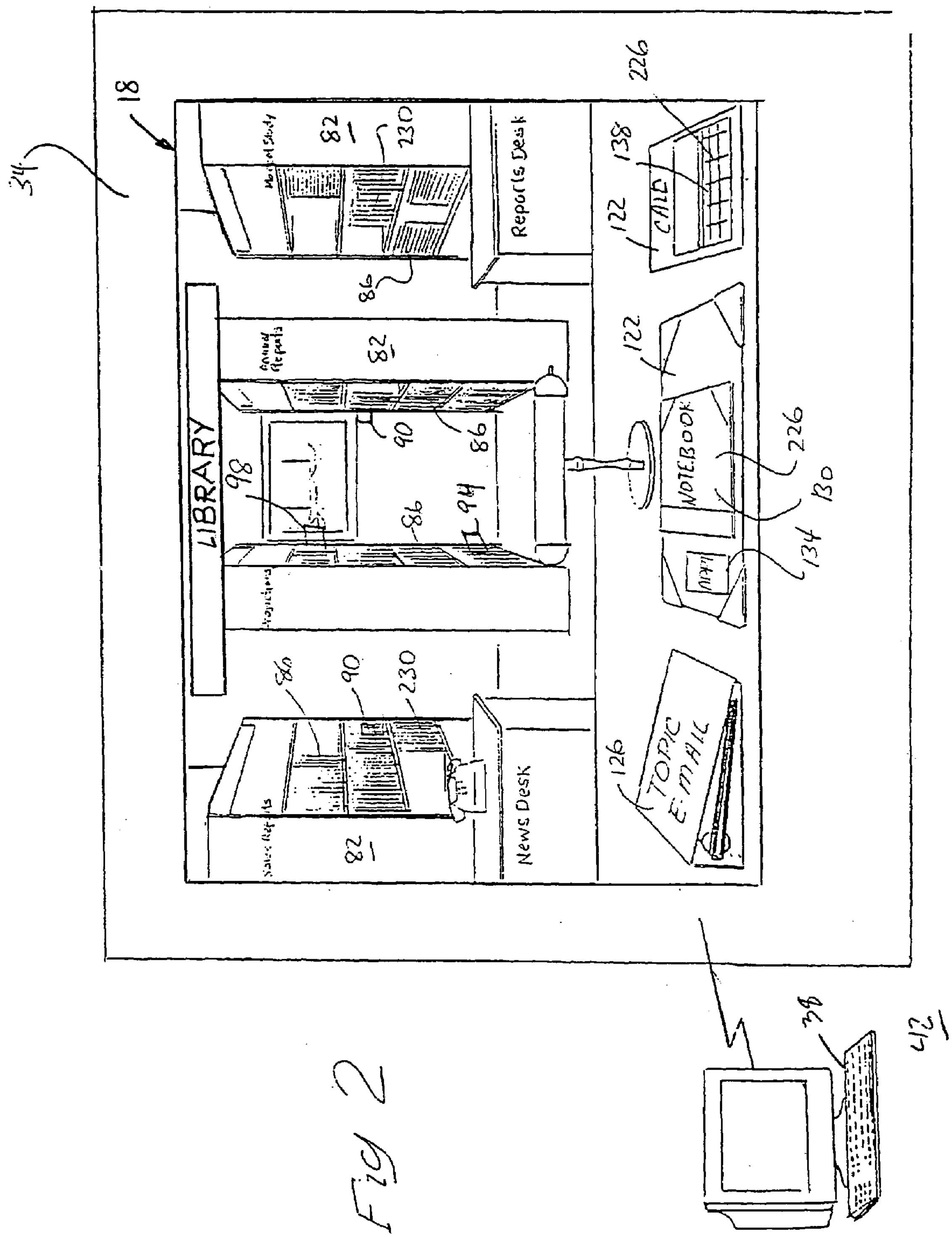
FIG. 2 is a schematic view of the library room of the FIG. 1 embodiment and related documents, references and tools.

In a further variant of the invention, as illustrated in FIGS. 2 and 5, the meeting space 34 includes a library room 78. The library room 78 includes at least one virtual bookshelf 82. The bookshelf 82 contains at least one document 86 relevant to the meeting 14. The document 86 is made accessible in the library room 78 by the coordinator 30.

In still a further variant, the library room 78 includes at least one bookmark 90. The bookmark 90 references a document 86, an Internet Website 94 or a local network information item 98 relevant to the meeting 14. The bookmark 90 is made accessible to all participants 26 by the coordinator 30.

Figure 3:
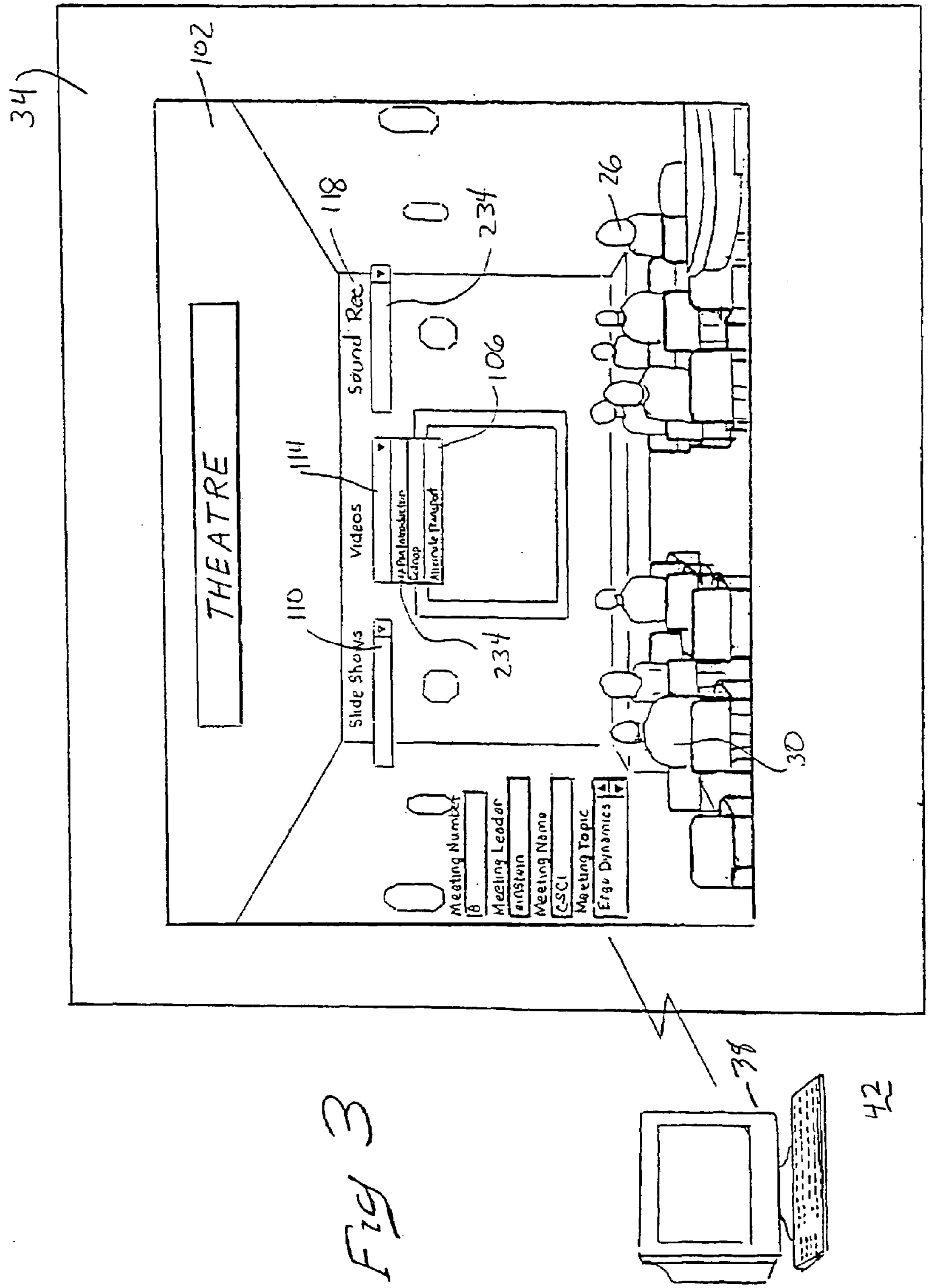
FIG. 3 is a schematic view of the theatre room of the FIG. 1 embodiment and related multi-media documents, references, messages and participants.

In yet another variant of the invention, as illustrated in FIGS. 3 and 5, the meeting space 34 includes a theatre room 102. The theatre room 102 includes at least one multimedia document 106 relevant to the meeting 14. The multimedia document 106 is made accessible in the theatre room 102 by the coordinator 30. In still another variant, the multimedia document 106 is a slide show 110, streaming video 114 or sound recording 118.

In a further variant, as illustrated in FIGS. 2 and 5, the meeting center 10 includes a series of tools 122 for use of meeting participants 26. The tools 122 include topical email 126, a notebook 130, an appointment book 134 and a calculator 138.

Figure 4:
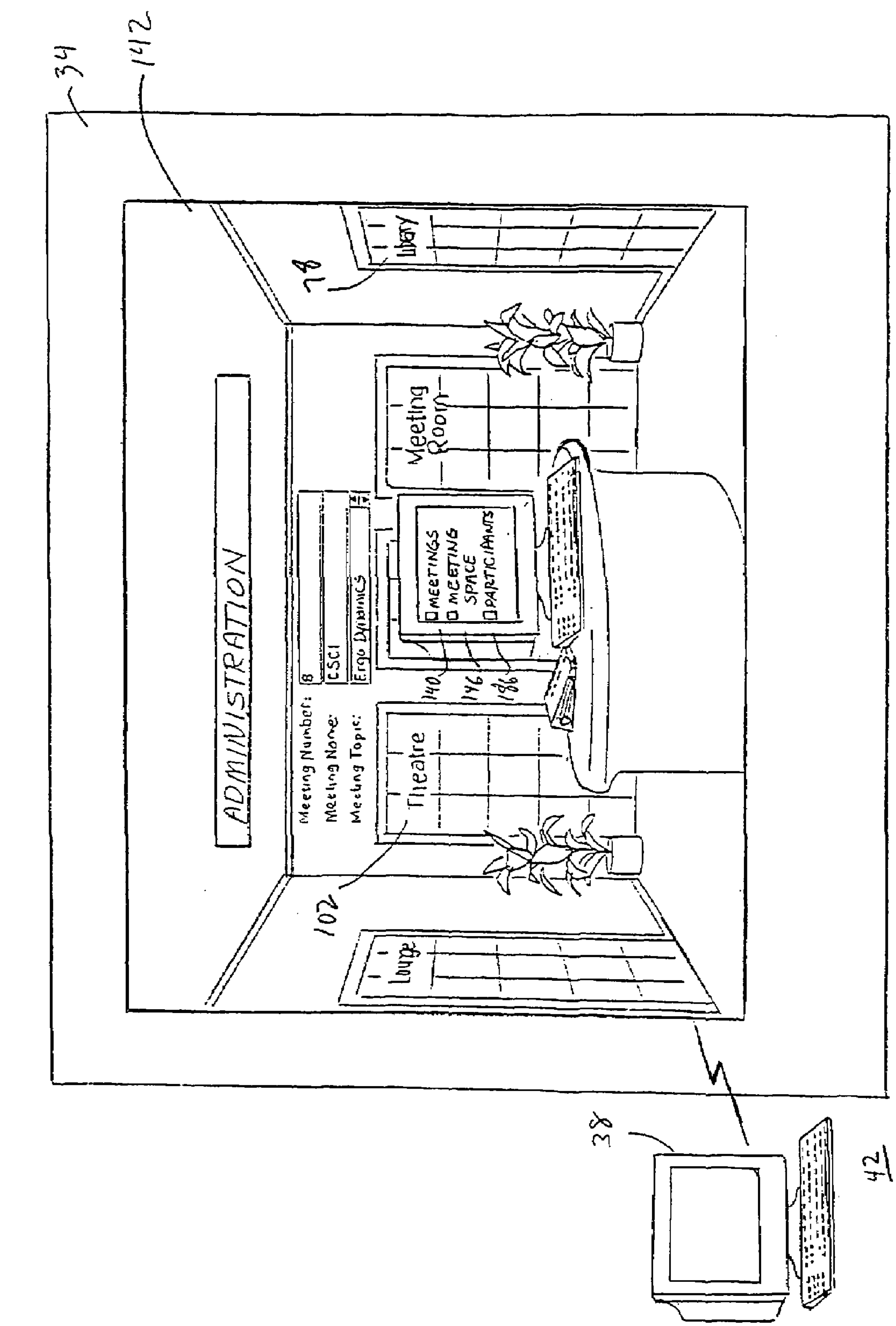
FIG. 4 is a schematic view of the administration room of the FIG. 1 embodiment.
Figure 4A:
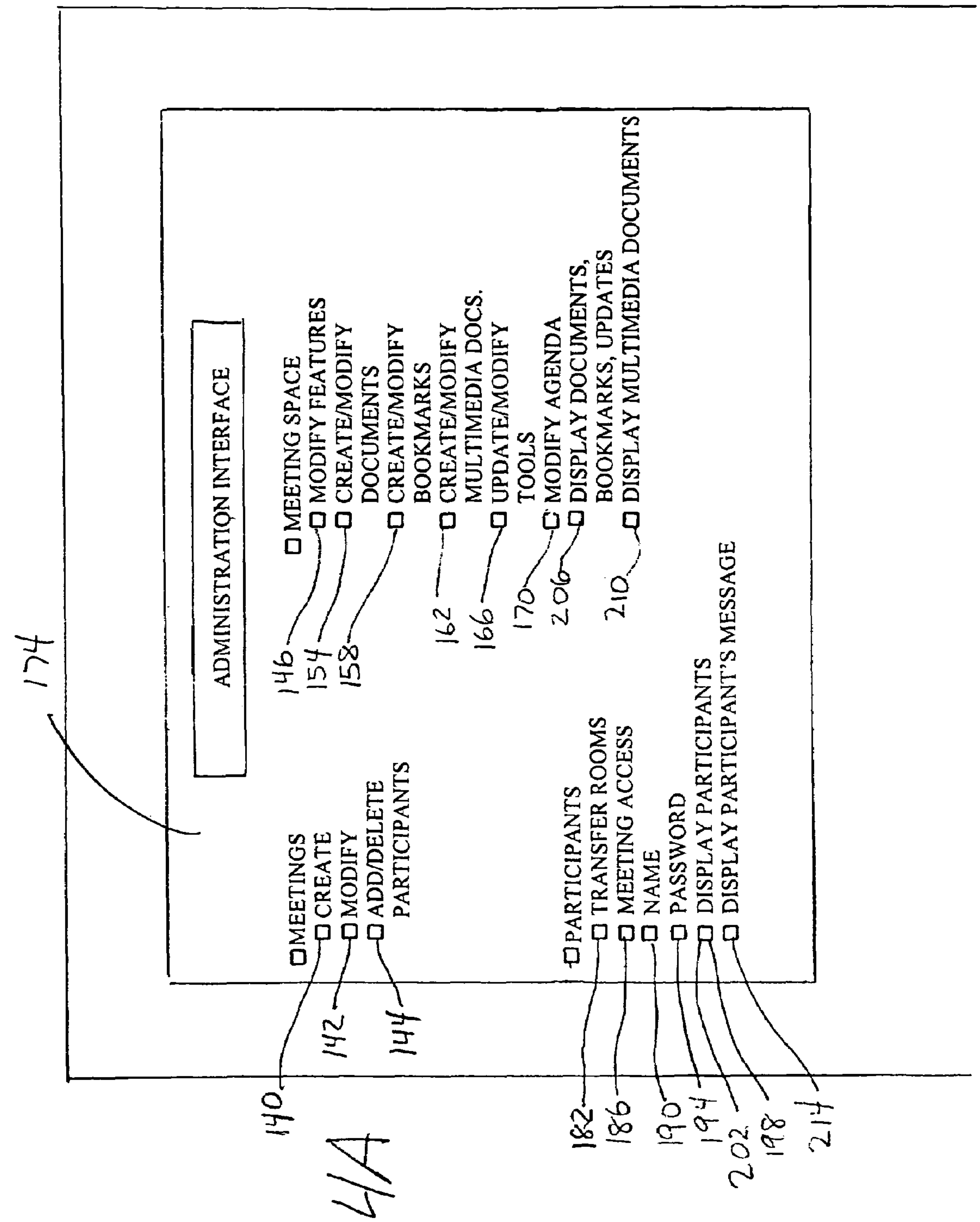
FIG. 4*a* is a detailed schematic view of the administration interface of the FIG. 1 embodiment.

In yet a further variant of the invention, as illustrated in FIGS. 4 and 4*a* and 5, the meeting space 34 further comprises an administration room 142. The administration room 142 includes means 140 for creating new meetings 14, means 148 for modifying the meeting 14, means 144 for adding and deleting participants 26 from the meeting 14, means 146 for modifying features 150 of the meeting space 34, means 154 for creating and modifying documents 86 for the library room 78, means 158 for creating and modifying bookmarks 90 for the library room 78, means 162 for creating and modifying multimedia documents 106 for the theatre room 102, means 166 for updating and modifying tools 122 and means 170 for modifying the agenda 62.

In still a further variant, as illustrated in FIGS. 1 and 4, either the confirmation of the completion of an action item 70 or the updating of an action item 70 by the coordinator 30 will forward at least one message 46 to the administration room 142, the participant 26, the meeting space 34, the library room 78, the theatre room 102 or the tools 122.

In another variant of the invention, as illustrated in FIG. 4*a*, the electronic meeting center 10 includes a user-friendly, question and answer interface 174 for creating and modifying meetings 14, adding and deleting participants 26 from the meeting 14, modifying features 150 of the meeting space 34, creating and modifying documents 86 and bookmarks 90 for the library room 78 and creating and modifying multimedia documents 106 for the theatre room 102.

In yet another variant, the electronic meeting center 10 includes a means 182 for participants 26 to transfer between rooms 78, 102, 142 of the meeting space 34. In still a further variant of the invention, the electronic meeting center 10 includes a means 186 for controlling access to the meeting 14. This means 186 include means 190 for verifying a name 18 and a password 194 for a participant 26, a means 198 for displaying other participants 26 currently accessing the meeting 14, a means 202 for displaying other participants 26 who have accessed the meeting 14 since the participant 26 last accessed the meeting 14, a means 206 for displaying available documents 86, updates 208 to documents 86 and bookmarks 90 available since the participant 90 last accessed the meeting 14, a means 210 for displaying available multimedia documents 106 available since the participant 26 last accessed the meeting 14 and a means 214 for displaying all messages 46 relevant to the participant 26 and the meeting 14.

In still a further variant, as illustrated in FIG. 1, the message 46 is chat message 218. The chat message 218 is appended to the dialogue buffer 50 and maintained there for the duration of the meeting 14 and is available to all participants 26. In another variant of the invention, the message 46 is an instant message 222. The instant message 222 is delivered only to the participant 26 for whom the message 46 is intended and is removed from the meeting center 10 after the intended participant 26 is no longer accessing the meeting space 34.

In yet a further variant of the invention, as illustrated in FIGS. 2 and 5, the message 46 is a tool message 226. The tool message 226 is automatically directed to the appropriate tool 122 for interaction with the tool 122. In still a further variant, the message 46 is a document status message 230, the document status message 230 being directed to the library room 78 as document availability and updating are affected.

In another variant, as illustrated in FIG. 3, the message 46 is a multimedia document status message 234. The multimedia document status message 234 is directed to the theatre room 102 as multimedia document availability and updating are affected.

In still another variant, as illustrated in FIG. 1, the message 46 is an agenda update message 238. The agenda update message 238 is directed to the meeting space 34 for viewing by interested participants 26.

In a final variant of the invention, as illustrated in FIG. 1, the message 46 is a general event message 242. The general event message 242 is automatically generated when a participant 26 accesses or leaves the meeting center 10. This message 242 is used to inform other participants 26 of meeting attendees 26 and for directing of other messages 46 to participants 26 when they have accessed the system 10.

The electronic meeting center 10 has been described with reference to particular embodiments. Other modifications and enhancements can be made without departing from the spirit and scope of the claims that follow.

What is claimed is:

1. An electronic meeting center, comprising:

at least one persistent, server-based meeting; said meeting having a unique identifying name and a unique identifying topic;

at least one identified participant, said participant being authorized to attend said meeting;

at least one identified coordinator, said coordinator being authorized to add and remove participants;

at least one persistent, server-based virtual meeting space, said meeting space being associated with said meeting;

means for said participants and said coordinator to access the meeting space from remote locations;

at least one message, said message including information relevant to the meeting and being identified with the meeting through the name and the topic; and a dialogue buffer, said buffer being associated with said meeting space and said meeting and being capable of storing a message for review by participants.

2. An electronic meeting center, as described in claim 1, wherein the meeting further comprises a description and at least one keyword.

3. An electronic meeting center, as described in claim 1, wherein the meeting space further comprises:

an agenda, said agenda including at least one goal associated with the meeting, at least one action item associated with the goal and being available to participants for viewing; and means for representing the access of the meeting by the participant, thereby informing participants of meeting access by other participants.

4. An electronic meeting center, as described in claim 1, wherein the meeting space further comprises a library room, said library room including at least one virtual bookshelf, said bookshelf containing at least one document relevant to the meeting, said document having been made accessible in the library room by the coordinator.

5. A library room as described in claim 4, further comprising at least one bookmark, said bookmark referencing one of a document, an Internet Website, and a local network information item relevant to the meeting, said bookmark being made accessible to all participants by the coordinator.

6. An electronic meeting center, as described in claim 1, wherein the meeting space further comprises a theatre room, said theatre room including at least one multimedia document relevant to the meeting, said multimedia document having been made accessible in the theatre by the coordinator.

7. An electronic meeting center, as described in claim 1 further comprising a series of tools for use of meeting participants, said tools including topical email, a notebook, an appointment book and a calculator.

8. An electronic meeting center, as described in claim 3, claim 4, claim 5, claim 6 or claim 7, wherein the meeting space further comprises an administration room, said administration room comprising:

means for creating new meetings;

means for modifying the meeting;

means for adding and deleting participants from the meeting;

means for modifying features of the meeting space;

means for creating and modifying documents for the library room;

means for creating and modifying bookmarks for the library room;

means for creating and modifying multimedia documents for the theatre room;

means for updating and modifying tools; and means for modifying the agenda.

9. An electronic meeting center, as described in claim 8, wherein one of the confirmation of the completion of an action item by the coordinator and the updating of an action item by the coordinator will forward at least one message to at least one of the administration room, the participant, the meeting space, the library room, the theatre room and the tools.

10. An electronic meeting center, as described in claim 8 further comprising a user-friendly, question and answer interface for creating and modifying meetings, adding and deleting participants from the meeting, modifying features of the meeting space, creating and modifying documents and bookmarks for the library and creating and modifying multimedia documents for the theatre.

11. An electronic meeting center, as described in claim 1, wherein the message is a document status message, said document status message being directed to the library room as document availability and updating are affected.

12. An electronic meeting center, as described in claim 1, wherein the message is a multimedia document status message, said multimedia document status message being directed to the theatre room as multimedia document availability and updating are affected.

13. An electronic meeting center, as described in claim 1, wherein the message is an agenda update message, said agenda update message being directed to the meeting space for viewing by interested participants.

14. An electronic meeting center, as described in claim 1, wherein the message is a general event message, said general event message being automatically generated when a participant accesses or leaves the meeting center and used to inform other participants of meeting attendees and used for directing of other messages to participants when they have accessed the system.

15. An electronic meeting center, comprising:

at least one persistent, server-based meeting; said meeting having a unique identifying name and a unique identifying topic;

at least one identified participant, said participant being authorized to attend said meeting;

at least one identified coordinator, said coordinator being authorized to add and remove participants;

at least one persistent, server-based virtual meeting space, said meeting space being associated with said meeting;

means for said participants and said coordinator to access the meeting space from remote locations;

at least one message, said message including information relevant to the meeting and being identified with the meeting through the name and the topic;

a dialogue buffer, said buffer being associated with said meeting space and said meeting and being capable of storing a message for review by participants;

a description; and at least one keyword.

16. An electronic meeting center, comprising:

at least one persistent, server-based meeting; said meeting having a unique identifying name and a unique identifying topic;

at least one identified participant, said participant being authorized to attend said meeting;

at least one identified coordinator, said coordinator being authorized to add and remove participants;

at least one persistent, server-based virtual meeting space, said meeting space being associated with said meeting;

means for said participants and said coordinator to access the meeting space from remote locations;

at least one message, said message including information relevant to the meeting and being identified with the meeting through the name and the topic; and a dialogue buffer, said buffer being associated with said meeting space and said meeting and being capable of storing a message for review by participants;

an agenda, said agenda including at least one goal associated with the meeting, at least one action item associated with the goal and being available to participants for viewing; and means for representing the access of the meeting by the participant, thereby informing participants of meeting access by other participants.

17. An electronic meeting center, comprising:

at least one persistent, server-based meeting; said meeting having a unique identifying name and a unique identifying topic;

at least one identified participant, said participant being authorized to attend said meeting;

at least one identified coordinator, said coordinator being authorized to add and remove participants;

at least one persistent, server-based virtual meeting space, said meeting space being associated with said meeting;

means for said participants and said coordinator to access the meeting space from remote locations;

at least one message, said message including information relevant to the meeting and being identified with the meeting through the name and the topic;

a dialogue buffer, said buffer being associated with said meeting space and said meeting and being capable of storing a message for review by participants;

a library room, said library room including at least one virtual bookshelf, said bookshelf containing at least one document relevant to the meeting, said document having been made accessible in the library room by the coordinator.

18. A library room as described in claim 17, further comprising at least one bookmark, said bookmark referencing one of a document, an Internet Website, and a local network information item relevant to the meeting, said bookmark being made accessible to all participants by the coordinator.

19. An electronic meeting center, comprising:

at least one persistent, server-based meeting; said meeting having a unique identifying name and a unique identifying topic;

at least one identified participant, said participant being authorized to attend said meeting;

at least one identified coordinator, said coordinator being authorized to add and remove participants;

at least one persistent, server-based virtual meeting space, said meeting space being associated with said meeting;

means for said participants and said coordinator to access the meeting space from remote locations;

at least one message, said message including information relevant to the meeting and being identified with the meeting through the name and the topic;

a dialogue buffer, said buffer being associated with said meeting space and said meeting and being capable of storing a message for review by participants; and a theatre room, said theatre room including at least one multimedia document relevant to the meeting, said multimedia document having been made accessible in the theatre by the coordinator.

20. An electronic meeting center, comprising:

at least one persistent, server-based meeting; said meeting having a unique identifying name and a unique identifying topic;

at least one identified participant, said participant being authorized to attend said meeting;

at least one identified coordinator, said coordinator being authorized to add and remove participants;

at least one persistent, server-based virtual meeting space, said meeting space being associated with said meeting;

means for said participants and said coordinator to access the meeting space from remote locations;

at least one message, said message including information relevant to the meeting and being identified with the meeting through the name and the topic;

a dialogue buffer, said buffer being associated with said meeting space and said meeting and being capable of storing a message for review by participants; and a series of tools for use of meeting participants, said tools including topical email, a notebook, an appointment book and a calculator.

21. An electronic meeting center, as described in claim 16, claim 17, claim 18, claim 19 or claim 20, wherein the meeting space further comprises an administration room, said administration room comprising:

means for creating new meetings;

means for modifying the meeting;

means for adding and deleting participants from the meeting;

means for modifying features of the meeting space;

means for creating and modifying documents for the library room;

means for creating and modifying bookmarks for the library room;

means for creating and modifying multimedia documents for the theatre room;

means for updating and modifying tools; and means for modifying the agenda.

22. An electronic meeting center, as described in claim 21, wherein one of the confirmation of the completion of an action item by the coordinator and the updating of an action item by the coordinator will forward at least one message to at least one of the administration room, the participant, the meeting space, the library room, the theatre room and the tools.

23. An electronic meeting center, as described in claim 21 further comprising a user-friendly, question and answer interface for creating and modifying meetings, adding and deleting participants from the meeting, modifying features of the meeting space, creating and modifying documents and bookmarks for the library and creating and modifying multimedia documents for the theatre.

24. An electronic meeting center, comprising:

at least one persistent, server-based meeting; said meeting having a unique identifying name and a unique identifying topic;

at least one identified participant, said participant being authorized to attend said meeting;

at least one identified coordinator, said coordinator being authorized to add and remove participants;

at least one persistent, server-based virtual meeting space, said meeting space being associated with said meeting;

means for said participants and said coordinator to access the meeting space from remote locations;

at least one message, said message including information relevant to the meeting and being identified with the meeting through the name and the topic; and a dialogue buffer, said buffer being associated with said meeting space and said meeting and being capable of storing a message for review by participants;

wherein the message is a document status message, said document status message being directed to the library room as document availability and updating are affected.

25. An electronic meeting center, comprising:

at least one persistent, server-based meeting; said meeting having a unique identifying name and a unique identifying topic;

at least one identified participant, said participant being authorized to attend said meeting;

at least one identified coordinator, said coordinator being authorized to add and remove participants;

at least one persistent, server-based virtual meeting space, said meeting space being associated with said meeting;

means for said participants and said coordinator to access the meeting space from remote locations;

at least one message, said message including information relevant to the meeting and being identified with the meeting through the name and the topic; and a dialogue buffer, said buffer being associated with said meeting space and said meeting and being capable of storing a message for review by participants;

wherein the message is a multimedia document status message, said multimedia document status message being directed to the theatre room as multimedia document availability and updating are affected.

26. An electronic meeting center, comprising:

at least one persistent, server-based meeting; said meeting having a unique identifying name and a unique identifying topic;

at least one identified participant, said participant being authorized to attend said meeting;

at least one identified coordinator, said coordinator being authorized to add and remove participants;

at least one persistent, server-based virtual meeting space, said meeting space being associated with said meeting;

means for said participants and said coordinator to access the meeting space from remote locations;

at least one message, said message including information relevant to the meeting and being identified with the meeting through the name and the topic; and a dialogue buffer, said buffer being associated with said meeting space and said meeting and being capable of storing a message for review by participants;

wherein the message is an agenda update message, said agenda update message being directed to the meeting space for viewing by interested participants.

27. An electronic meeting center, comprising:

at least one persistent, server-based meeting; said meeting having a unique identifying name and a unique identifying topic;

at least one identified participant, said participant being authorized to attend said meeting;

at least one identified coordinator, said coordinator being authorized to add and remove participants;

at least one persistent, server-based virtual meeting space, said meeting space being associated with said meeting;

means for said participants and said coordinator to access the meeting space from remote locations;

at least one message, said message including information relevant to the meeting and being identified with the meeting through the name and the topic; and a dialogue buffer, said buffer being associated with said meeting space and said meeting and being capable of storing a message for review by participants;

wherein the message is a general event message, said general event message being automatically generated when a participant accesses or leaves the meeting center and used to inform other participants of meeting attendees and used for directing of other messages to participants when they have accessed the system.

* * * * *